(12) United States Patent
Adam et al.

(10) Patent No.: US 6,320,861 B1
(45) Date of Patent: Nov. 20, 2001

(54) HYBRID SCHEME FOR QUEUING IN A SHARED MEMORY ATM SWITCH BUFFER

(75) Inventors: Joel Adam, Baden; Joseph C. Kantz, Beaver Falls, both of PA (US)

(73) Assignee: Marconi Communications, Inc., Warrendale, PA (US)

( * ) Notice: Subject to any disclaimer, the term of this patent is extended or adjusted under 35 U.S.C. 154(b) by 0 days.

(21) Appl. No.: 09/079,589

(22) Filed: May 15, 1998

(51) Int. Cl.[7] ............................. H04L 12/28; H04L 12/56
(52) U.S. Cl. ................................. 370/395; 370/412
(58) Field of Search .......................... 370/229, 230, 370/235, 236, 395, 396, 399, 412, 413–418, 428, 429

(56) References Cited

U.S. PATENT DOCUMENTS

| | | | |
|---|---|---|---|
| 5,392,280 | * 2/1995 | Zheng | 370/412 |
| 5,577,035 | * 11/1996 | Hayter et al. | 370/395 |
| 5,608,726 | * 3/1997 | Virgile | 370/401 |
| 5,689,506 | * 11/1997 | Chiussi et al. | 370/388 |
| 5,784,003 | * 7/1998 | Dahlgren | 340/825.79 |
| 5,898,687 | * 4/1999 | Harriman et al. | 370/390 |
| 5,982,775 | * 11/1999 | Brunner et al. | 370/401 |
| 6,101,187 | * 8/2000 | Cukier et al. | 370/396 |

* cited by examiner

Primary Examiner—Ajit Patel
(74) Attorney, Agent, or Firm—Ansel M. Schwartz

(57) ABSTRACT

A switch for an ATM communication system. The ATM communication system has an ATM network on which ATM cells travel, source nodes connected to the ATM network which produce ATM cells and send them onto the ATM network, and destination nodes connected to the ATM network which receive ATM cells from the ATM network. The switch comprises input ports through which cells are received from the ATM network. The switch comprises output ports through which cells are transmitted to the ATM network. The switch comprises a switching mechanism connected to the input ports and output ports which transfer cells from the input ports to output ports. The switching mechanism has a unicast sending mechanism for sending unicast cells to an output port and has a multicast sending mechanism for sending multicast cells to a desired output port. The multicast sending mechanism is separate and different from the unicast sending mechanism.

5 Claims, 3 Drawing Sheets

HYBRID BUFFER MANAGEMENT ARCHITECTURE

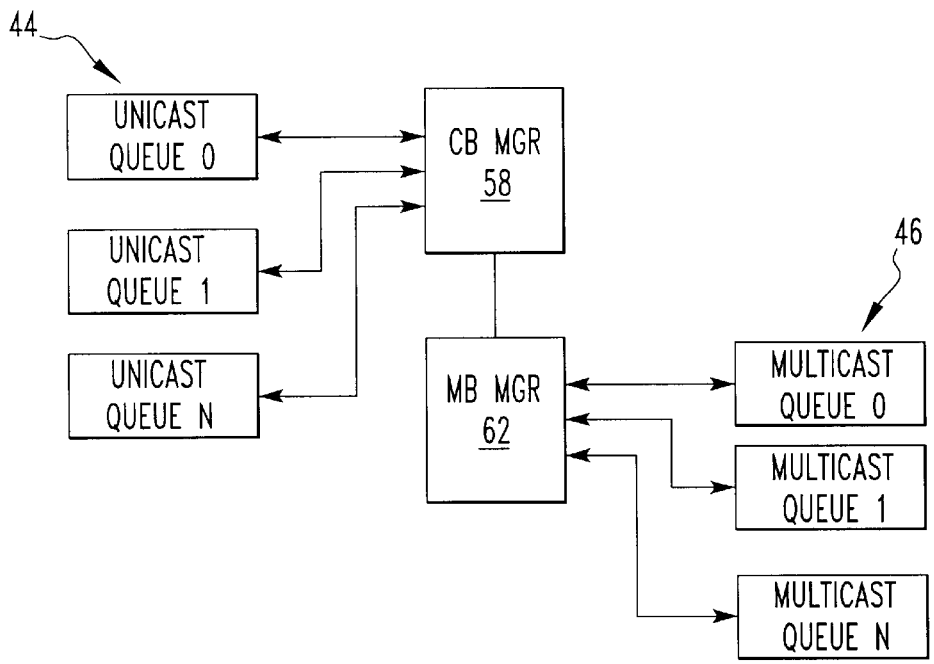
HYBRID BUFFER MANAGEMENT ARCHITECTURE
FIG.1
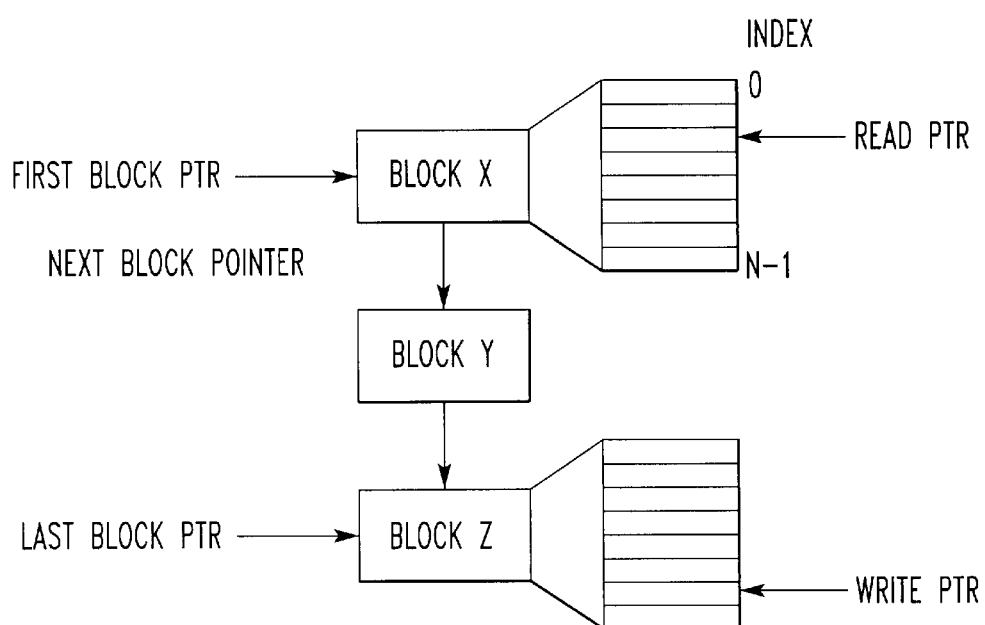
FIG.2  UNICAST QUEUE LINKED-LIST

HYBRID SCHEME FOR QUEUING IN A SHARED MEMORY ATM SWITCH BUFFER

FIELD OF THE INVENTION

The present invention is related to sending unicast and multicast ATM cells over an ATM network. More specifically, the present invention is related to sending unicast and multicast cells over an ATM network using distinct techniques for unicast cells and for multicast cells.

BACKGROUND OF THE INVENTION

As ATM cells traverse an ATM switch from an input port to an output port, they are stored temporarily in buffers at various stages of the switch. There are several types of buffers. One type of buffer is a shared memory buffer. In a shared memory buffer, cells are assigned to queues which correspond to output ports of the stage of the switch, and these queues share the same physical memory. One of the challenges in designing a shared memory buffer is buffer and queue management.

Buffer management consists of allocating space in the shared memory for the queues as they grow and reclaiming space in the memory as the queues shrink. Queue management consists of tracking the cells that are in the queue by tracking the addresses of those cells within the shared memory in lists. As cells are added to the queue, addresses are added to the list and as cells are read from the queue, they are removed. Buffer and queue management are closely related.

Current shared memory buffer and queue management techniques vary in the way they maintain queues in physical memory and in the way they handle unicast and multicast cells. These two types of cells differ in that a unicast cell is destined for only one output port of the buffer and a multicast cell can be destined for several output ports. One management strategy consists of dividing the shared memory into small blocks and organizing the queues as FIFOs (first-in first-out) containing linked lists of memory blocks. Each cell is stored in only one queue and the queues are tracked by means of block pointers. Typically, there is one unicast queue for each output port and one multicast queue which serves all of the output ports. This scheme is memory efficient but presents problems for multicast. Since a multicast cell is stored in a single multicast queue, a sophisticated scheduling algorithm is needed in order to choose between the multicast queue and several unicast queues as cells are read from the buffer and sent to the output ports of the switch stage since the cells in the multicast queue go to several output ports. Another problem with this strategy is head-of-the-line blocking within the multicast queue.

A second management strategy consists of organizing the queues as FIFOs (first-in first-out) that hold shared memory addresses of cells. It should be noted that adjacent cells in the FIFO can be stored in memory addresses that are not necessarily adjacent. One FIFO exists for each output port, and both unicast and multicast cells are stored in it. A copy of the multicast cell is placed in the FIFO of each destination in the multicast. This scheme has the advantage of requiring a simpler scheduling algorithm and not suffering from head-of-the-line blocking but requires very large memories for the address FIFOs.

The present invention describes a hybrid buffer and queue management scheme in which queues consisting of unicast ATM cells are organized as linked-lists of memory blocks and queues consisting of multicast ATM cells are organized as address lists. This scheme has the advantage of being very memory efficient for unicast queue management, uses a shared memory for both unicast and multicast cells, and requires a simple scheduling algorithm for reading cells from the buffer.

SUMMARY OF THE INVENTION

The present invention pertains to a switch for an ATM communication system. The ATM communication system has an ATM network on which ATM cells travel, source nodes connected to the ATM network which produce ATM cells and send them onto the ATM network, and destination nodes connected to the ATM network which receive ATM cells from the ATM network. The switch comprises input ports through which cells are received from the ATM network. The switch comprises output ports through which cells are transmitted to the ATM network. The switch comprises a switching mechanism connected to the input ports and output ports which transfer cells from the input ports to output ports. The switching mechanism has a unicast sending mechanism for sending unicast cells to an output port and has a multicast sending mechanism for sending multicast cells to a desired output port. The multicast sending mechanism is separate and different from the unicast sending mechanism.

The present invention pertains to a method for sending ATM cells over an ATM network. The method comprises the steps of receiving a first ATM unicast cell at a switch connected to the ATM network from the ATM network. Then there is the step of routing the first unicast cell out a first output port of the switch to the ATM network with a unicast sending mechanism. Next there is the step of receiving an ATM multicast cell at the switch from the ATM network. Then there is the step of routing the multicast cell out the first output port to the ATM network with a multicast sending mechanism. The multicast sending mechanism is separate and different from the unicast sending mechanism.

BRIEF DESCRIPTION OF THE DRAWINGS

In the accompanying drawings, the preferred embodiment of the invention and preferred methods of practicing the invention are illustrated in which:

FIG. 1 is a schematic representation of the buffer management architecture of the switching mechanism of the present invention.

FIG. 2 is a schematic representation of a unicast queue linked-list.

DESCRIPTION OF THE PREFERRED EMBODIMENT

Figure 3:
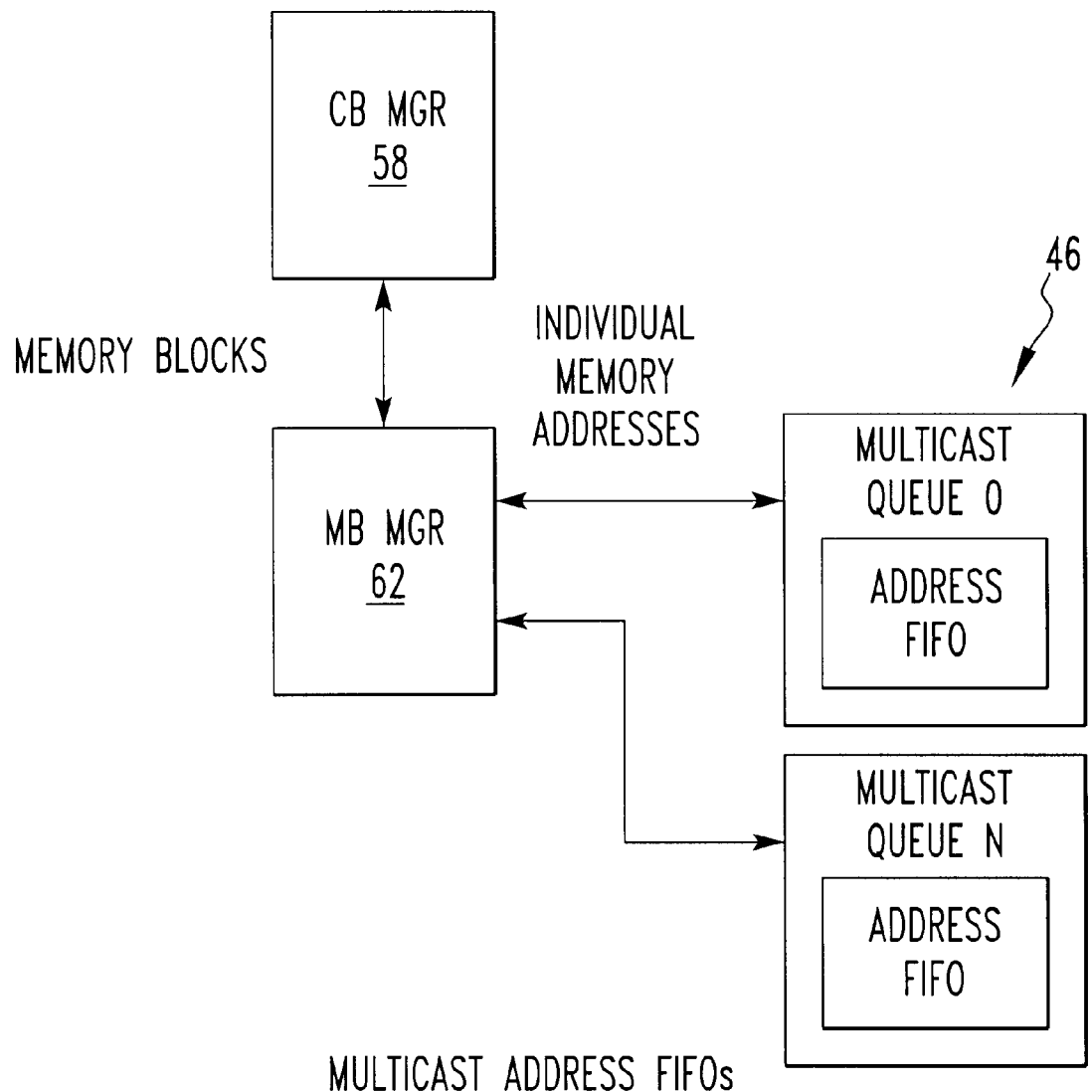
FIG. 3 is a schematic representation of multicast address FIFOs.
Figure 4:
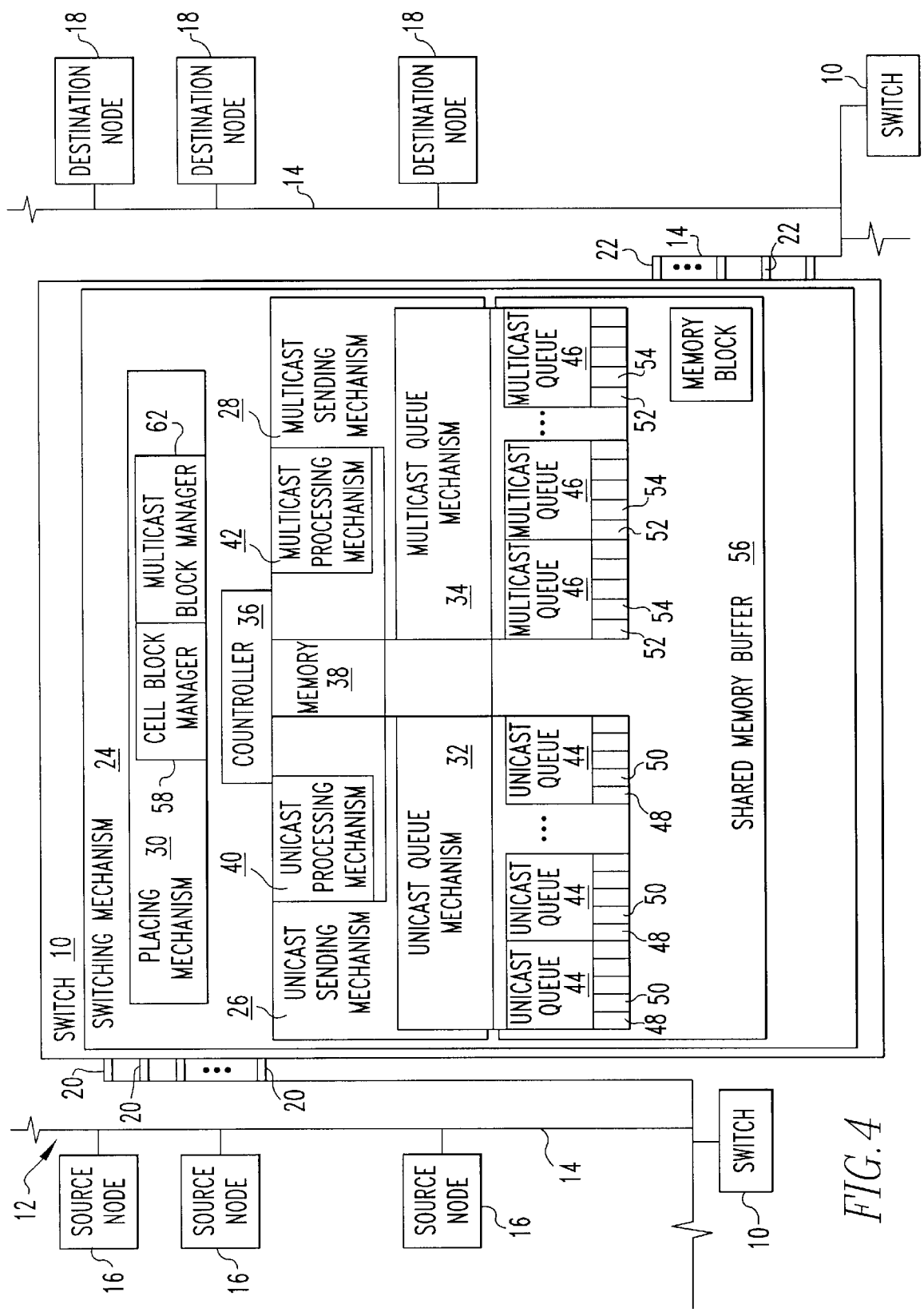
FIG. 4 is a schematic representation of a system of the present invention.

Referring now to the drawings wherein like reference numerals refer to similar or identical parts throughout the several views, and more specifically to figure thereof, there is shown a switch 10 for an ATM communication system 12. The ATM communication system 12 has an ATM network 14 on which ATM cells travel, source nodes 16 connected to the ATM network 14 which produce ATM cells and send them onto the ATM network 14, and destination nodes 18 connected to the ATM network 14 which receive ATM cells from the ATM network 14. The switch 10 comprises input ports 20 through which cells are received from the ATM network 14. The switch 10 comprises output ports 22 through which cells are transmitted to the ATM network 14. The switch 10 comprises a switching mechanism 24 connected to the input ports 20 and output ports 22 which transfer cells from the input ports 20 to output ports 22. The switching mechanism 24 has a unicast sending mechanism 26 for sending unicast cells to an output port and has a multicast sending mechanism 28 for sending multicast cells to a desired output port. The multicast sending mechanism 28 is separate and different from the unicast sending mechanism 26.

The switch 10 preferably includes a mechanism for placing a unicast cell with the unicast sending mechanism 26 and a multicast cell with a multicast sending mechanism 28. The placing mechanism 30 is in communication with the input ports 20 and the unicast sending mechanism 26 and the multicast sending mechanism 28.

The unicast sending mechanism 26 preferably includes a unicast queue mechanism 32 for holding unicast cells until they are to be transmitted out an output port and the multicast sending mechanism 28 includes a multicast queue mechanism 34 for holding multicast cells until they are to be sent out output ports 22.

Preferably, the switch 10 includes a controller 36 and a memory 38 connected to the controller 36. The unicast sending mechanism 26 includes a unicast processing mechanism 40 disposed in the memory 38 which the controller 36 uses to process unicast cells in the unicast queue mechanism 32 and send the unicast cells out the desired output port. The multicast sending mechanism 28 includes a multicast processing mechanism 42 disposed in the memory 38 which the controller 36 uses to process multicast cells in the multicast queue mechanism 34 and send the multicast cells out the desired output ports 22.

The unicast queue mechanism 32 preferably includes a unicast queue 44 associated with each output port. Each unicast queue 44 is connected to the placing mechanism 30 and to the controller 36. Each unicast queue 44 holds a data structure for tracking the unicast cells until they are to be sent out the associated output ports 22 by the controller 36.

Preferably, the multicast queue mechanism 34 includes a multicast queue 46 associated with each output port. Each multicast queue 46 is connected to the placing mechanism 30 and to the controller 36. Each multicast queue 46 holds a data structure for tracking the multicast cells until they are to be sent out the associated output ports 22 by the controller 36.

Each unicast queue 44 preferably has a first unicast sub-queue which holds unicast cells for a first service class and a second unicast sub-queue which holds unicast cells for a second service class. Preferably, each multicast queue 46 has a first multicast sub-queue which holds multicast cells for a first service class and a second multicast sub-queue which holds multicast cells for a second service class. The switch 10 preferably includes a shared memory buffer 56 in which each queue is formed and the placing mechanism 30 includes a cell block manager 58 which allocates block memory segments 60 from the shared memory buffer 56.

Preferably, the placing mechanism 30 includes a multicast block manager 62 which manages shared memory allocated to the multicast queues. The multicast block manager 62 is connected to the cell block manager 58. Each unicast sub-queue of each unicast queue 44 preferably includes a linked list of shared memory blocks. Preferably, each multicast sub-queue of each multicast queue 46 includes an address FIFO built from a linked list consisting of blocks within a shared address memory.

The unicast processing mechanism 40 preferably decides which unicast queue 44 is to receive service from the controller 36 based on strict round robin, and which unicast sub-queue of the unicast queue 44 is to receive service from the controller 36 based on weighted rounded robin. The multicast processing mechanism 42 preferably decides which multicast queue 46 is to receive service from the controller 36 based on strict round robin, and which multicast sub-queue of the unicast queue 44 is to receive service from the controller 36 based on weighted rounded robin. Preferably, the controller 36 decides whether a unicast queue 44 or multicast queue 46 is to receive service from the controller 36 based on weighted round robin.

The present invention pertains to a method for sending ATM cells over an ATM network 14. The method comprises the steps of receiving a first ATM unicast cell at a switch 10 connected to the ATM network 14 from the ATM network 14. Then there is the step of routing the first unicast cell out a first output port of the switch 10 to the ATM network 14 with a unicast sending mechanism 26. Next there is the step of receiving an ATM multicast cell at the switch 10 from the ATM network 14. Then there is the step of routing the multicast cell out the first output port to the ATM network 14 with a multicast sending mechanism 28. The multicast sending mechanism 28 is separate and different from the unicast sending mechanism 26.

Preferably, the first unicast cell routing step includes the step of placing the first unicast cell with the unicast sending mechanism 26, and the multicast cell routing step includes the step of placing the multicast cell with the multicast sending mechanism 28. The first unicast cell placing step preferably includes the step of placing the first unicast cell into a unicast queue 44 associated with the first output port, and the multicast placing step includes the step of placing the multicast cell into a multicast queue 46 associated with the first output port.

Preferably, before the receiving the first unicast cell step there is the step of forming the unicast queue 44 and the multicast queue 46 from a shared memory buffer 56 with a cell block manager 58. The forming step preferably includes the step of requesting by a multicast block manager 62 for a memory block from the cell block manager 58 to allocate memory to multicast.

Preferably, after the receiving the first unicast cell step, there are the steps of receiving a second unicast cell at the switch 10. Then there is the step of placing the second unicast cell in the first unicast queue 44. Next there can be the step of pointing with a pointer from the first unicast cell to the second unicast cell to form a linked list of unicast cells.

Preferably, after the receiving of an $n^{th}$ unicast cell, where n is the shared memory block size, there are the steps of receiving an $(n+1)^{th}$ unicast cell at the switch, requesting a second shared memory block from the cell block manager, placing the $(n+1)^{th}$ cell in the second shared memory block, creating a pointer to the second shared memory block from the first shared memory block of the queue to form a linked list of shared memory blocks for the queue.

The multicast queue 46 placing step preferably includes the step of placing the multicast cell into an address FIFO.

More specifically, the switching mechanism 24 has a novel hybrid buffer and queue management scheme in which queues consisting of unicast ATM cells are organized as linked-lists of memory blocks and queues consisting of multicast ATM cells are organized as address lists. This scheme has the advantage of being very memory efficient for unicast queue 44 management, uses a shared memory for both unicast and multicast cells, and requires a simple scheduling algorithm for reading cells from the buffer.

This scheme is well-suited to the design of very high-speed shared memory buffers in which more sophisticated buffer techniques such as per-connection queueing are not feasible.

The hybrid buffer and queue management scheme is currently being implemented in an ASIC. The architecture of the buffer and queue management block of the ASIC is depicted in FIG. 1.

The hybrid buffer and queue management architecture consists of the following parts:

Cell Block manager 58 (CB MGR)—The cell block manager 58 manages the use of the shared memory buffer 56. The buffer is divided into blocks and the CB MGR tracks the usage of each block. A block can be in one of three states: allocated to a unicast queue 44, allocated to multicast or in the unused cell block list.

Multicast Block Manager 62 (MB MGR)—During enqueueing of cells, the multicast block manager 62 requests memory blocks from the CB MGR and allocates individual addresses within those blocks to the multicast queues. During dequeueing of cells, the MB MGR determines when all the cells within a memory block have been read and returns the block to the CB MGR.

Unicast Queues (UQ)—There is one unicast queue block for each output port which handles the queueing of unicast cells for that port. During enqueueing of cells, the UQ requests memory blocks from the CB MGR for cell storage. The memory blocks are arranged in a linked list to track their position within the queue. During dequeueing, the UQ returns blocks to the CB MGR when the last cell is read out of them.

Multicast Queues (MQ)—There is one multicast queue block for each output port which handles the queueing of multicast cells for that port. During enqueueing of cells, the MQ is handed shared memory addresses for cell storage by the MB MGR. These addresses are written at the tail of a FIFO to track the position of cells within the queue. During dequeueing, the MQ informs the MB MGR of the addresses which have been read.

The following sections describe how cells are enqueued and dequeued for unicast and multicast.

For unicast, a queue exists within the shared memory as a linked-list of memory blocks as depicted in FIG. 2. Each unicast queue 44 has a data structure for tracking the location of the queue within shared memory. The first block pointer (FBP) points to the first memory block in the queue. This block contains the next cell to be read from the queue. Within the block, there are memory location for n cells. The read pointer (RP) contains the index of the next cell to be read within the block while the indices below the RP correspond to cells which have already been read. When a cell is read from the queue, the address of the cell is formed by concatenating the FBP and RP, and the RP is incremented to point to the next cell in the queue. When a cell is read from the last index within a block, the block is returned to the CB_MGR which places it on the unused block list, the FBP is updated to the second block in the queue and RP is set to 0. The second block is determined from the next block pointer (NBP) associated with the first block.

The last block pointer (LBP) points to the last block in the queue. This block contains the next memory location where a cell added to the queue will be stored. The write pointer (WP) contains the index of the next free location within the block. When a cell is written to the queue, the memory address where it will be written is formed by concatenating the LBP and WP, and the WP is incremented. If the last index within the block has been used and another cell needs to be written to the queue, a new block is requested from the CB MGR, the LBP is updated to point to this block and WP is set to 0. In addition, the NBP of the former LBP is updated to point to the new LBP.

To avoid stranding partially-used blocks within a queue, the algorithm for returning empty blocks to the CB MGR can be optimized by returning blocks when only one block has been allocated to the queue and RP=WP.

Each UQ contains a set of queue management pointers (FBP, LBP, RP, WP). The linked-list information for each queue recorded by the NBPs is contained within the CB MGR.

Multicast queueing is more complicated than unicast because there is a second layer of buffer management and each queue tracks the cells in it by storing the addresses in a FIFO memory.

The multicast buffer and queue management architecture is depicted in FIG. 3. As space in the shared memory is required for multicast, the MB MGR requests memory blocks from the CB MGR. The MB MGR then allocates addresses within the block to multicast cells as they arrive. A multicast cell is added to the end of all the MQs to which it is destined by writing the memory address attached to it to the end of the address FIFO within each MQ. Therefore, one multicast cell is written to multiple multicast queues when it is enqueued.

When a multicast cell is read from a queue, the address of the next cell in the queue is determined by reading the address FIFO in the particular MQ being read. Multicast cells are read from one multicast queue 46 at a time.

For each block, the MB MGR maintains a count which is used to track when all the multicast cells stored at addresses within the block have been read out of the shared memory, therefore allowing the block to be handed back to the CB MGR and placed on the unused block list. This count is computed by incrementing the count by the number of queues a cell is written to when it is enqueued and decrementing by one each time a cell is read from an address that falls within the block. The count is initialized to zero when the block is first passed to the MB MGR. The block is empty of cells when the count falls to zero. At this point, it can be returned to the CB MGR.

Service classes can be introduced into this architecture by establishing a sub-queue for each service class within each unicast and multicast queue 46. For example, if there were four service classes, each unicast queue 44 would now consist of 4 service class sub-queues. For unicast queues, there would be a set of linked-list pointers for each service class. For multicast queues, an address FIFO would exist for each service class. An efficient way of implementing the service class FIFOs is to establish them as linked-lists within a shared address memory within the MQ in much the same way the unicast queues are linked-lists within the shared memory buffer 56. A service class block manager would be used to manage the allocation of blocks within the shared address memory to the service class queues. The scheduling algorithm would then have to take service class and queue type (unicast or multicast) into account when deciding which queue to read from next for a given output port.

The switching mechanism 24 is a cost effective manner for supporting large queue sizes and eliminates head-of-the-line blocking for multicast in a write-once read-many ATM shared-memory buffer.

In regard to large queue sizes, both the linked-list of memory blocks approach and the address list approach to queue maintenance require memory to support them. Of the two approaches, the linked-list of memory blocks is the more efficient in terms of memory. Therefore, the linked-list approach is preferable when allocating memory within the system 12 for queue management is costly, such as when the memory is embedded in an ASIC. For example, to support a queue size of 64K cells, the linked-list approach requires 22528 bits of dual ported-memory organized as 2048×11 (queue size/block size×number of bits to address the blocks) for a block size of 32 cells. This size memory can easily be embedded in an ASIC designed with current technology. In contrast, to support the same queue size, the address list approach requires:

1048576 bits of memory organized as 65536×16 (queue size×number of bits to address the memory) of single-port memory to store used cell addresses 1048576 bits of memory organized as 65536×16 (queue size×number of bits to address the memory) of single-port memory to store unused cell addresses This memory is too large to embed within a "reasonably-priced" ASIC. It is also costly to place outside of the ASIC in a separate memory chip due to the cost of the memory and the additional pins required on the ASIC to interface to the memory chip.

In regard to head-of-the-line blocking, the linked-list approach works very well for unicast queues but it leads to undesirable performance characteristics when used for multicast. In order to use the linked-list approach for multicast, the queue structure used would consist of only two levels. At the top level, in addition to the one queue for each destination used for unicast there would be one queue for multicast that would handle all multicast cells no matter the combination of destinations they went to. At the second level, there would be the priority queues. As they arrived at the buffer, multicast cells would be enqueued in the appropriate multicast priority queue.

The fact that all multicast cells for a given priority are enqueued in the same queue no matter which combination of destinations they are being routed to leads to a problem called head-of-the-line blocking which occurs when scheduling cells out of the memory in a read-many type buffer. Head-of-the-line blocking consists of not being able to read multicast cells that are deep in the queue even though the output ports 22 which those cells are destined for are unused because cells at the front of the queue have to be read first.

As an example, consider a switch buffer with 4 destinations 0,1,2,3. One of the multicast priority queues has 4 cells in it. The first two go to destinations 1 and 2. The last two go to destinations 0 and 3.

| queue location | cell destination |
|---|---|
| 4 | |
| 3 | 0 3 |
| 2 | 0 3 |
| 1 | 1 2 |
| 0 (first) | 1 2 |

An optimal way of reading these cells out of the queue would be to read cells 0 and 2 in parallel since the two cells are destined for different output ports 22. However, cell 2 can only be read after 0 and 1 have been read because it has to wait until it is in the first queue location. Therefore, cell 2 is delayed by 2 read cycles even though it could of been read in the very first read cycle. It has experienced head-of-the-line blocking (HOLB). In the extreme, HOLB can strand cells deep in the queue if the cells at the front experience a great deal of delay in being read.

In turn, in the switching mechanism 24, unicast cells are queued using a linked-list of memory blocks in order to support large queue sizes and multicast cells are stored using FIFO address lists in order to avoid the HOLB problem.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

What is claimed is:

1. A switch for an ATM communication system having an ATM network on which ATM cells travel, source nodes connected to the ATM network which produce ATM cells and send them onto the ATM network, and destination nodes connected to the ATM network which receive ATM cells from the ATM network comprising:

input ports through which cells are received from the ATM network; output ports through which cells are transmitted to the ATM network, and a switching mechanism connected to the input ports and output ports which transfer cells from the input ports to output ports, said switching mechanism having a unicast sending mechanism for sending unicast cells to an output port and having a multicast sending mechanism for sending multicast cells to a desired output port, said multicast sending mechanism separate and different from said unicast sending mechanism, the unicast sending mechanism includes a unicast queue mechanism for holding unicast cells until they are to be transmitted out an output port and the multicast sending mechanism includes a multicast queue mechanism for holding multicast cells until they are to be sent out output ports, the unicast queue mechanism includes a unicast queue associated with each output port, the multicast queue mechanism includes a multicast queue associated with each output port;

a shared memory buffer in which each queue is formed;

a mechanism for placing a unicast cell with the unicast sending mechanism and a multicast cell with a multicast sending mechanism, the placing mechanism includes a cell block manager which allocates block memory segments from the shared memory buffer, the placing mechanism includes a multicast block manager which manages memory allocated to the multicast queues, said multicast block manager connected to the cell block manager, said placing mechanism in communication with the input ports and the unicast sending mechanism and the multicast sending mechanism; and a controller and a memory connected to the controller, said unicast sending mechanism including a unicast processing mechanism disposed in the memory which the controller uses to process unicast cells in the unicast queue mechanism and send the unicast cells out the desired output port, said multicast sending mechanism including a multicast processing mechanism disposed in the memory which the controller uses to process multicast cells in the multicast queue mechanism and send the multicast cells out the desired output ports, each unicast queue connected to the placing mechanism and to the controller, each unicast queue holds a data structure for tracking the unicast cells until they are to be sent out the associated output ports by the controller, each unicast queue has a first unicast sub-queue which holds unicast cells for a first service class and a second unicast sub-queue which holds unicast cells for a second service class, each unicast sub-queue of each unicast queue includes a linked list of shared memory blocks, each multicast queue holds a data structure for tracking the multicast cells until they are to be sent out the associated output ports by the controller, each multicast queue has a first multicast sub-queue which holds multicast cells for a first service class and a second multicast sub-queue which holds multicast cells for a second service class, each multicast sub-queue of each multicast queue includes an address FIFO built from a linked list consisting of blocks within a shared address memory.

2. The switch as described in claim 1 wherein the unicast processing mechanism decides which unicast queue is to receive service from the controller based on strict round robin, and which unicast sub-queue of the unicast queue is to receive service from the controller based on weighted rounded robin.

3. The switch as described in claim 2 wherein the multicast processing mechanism decides which multicast queue is to receive service from the controller based on strict round robin, and which multicast sub-queue of the unicast queue is to receive service from the controller based on weighted rounded robin.

4. A switch as described in claim 3 wherein the controller decides whether a unicast queue or multicast queue is to receive service from the controller based on weighted round robin.

5. A method for sending ATM cells over an ATM network comprising the steps of:

receiving a first ATM unicast cell at a switch connected to the ATM network from the ATM network;

forming a unicast queue having unicast sub-queues each unicast sub-queue of each unicast queue includes a linked list of shared memory blocks and is associated with a respective service class, and a multicast queue having multicast sub-queues, each multicast sub-queue of each multicast queue is associated with a respective service class and includes an address FIFO built from a linked list of blocks, from a shared memory buffer with a cell block manager;

requesting by a multicast block manager for a first memory block from the cell block manager to allocate memory to multicast;

placing the first unicast cell into the first unicast queue associated with the first output port;

routing the first unicast cell out a first output port of the switch to the ATM network with a unicast sending mechanism;

receiving a second unicast cell at the switch;

placing the second unicast cell in the first unicast queue;

receiving an $n_{th}$ unicast cell, where n is the shared memory block size;

receiving an $(n+1)^{th}$ unicast cell at the switch;

requesting a second memory block from the cell block manager placing the $(n+1)^{th}$ cell in the second memory block;

creating a pointer to the second memory block from the first memory block of the queue to form a linked list of shared memory blocks for the multicast queue;

receiving an ATM multicast cell at the switch from the ATM network;

routing the multicast cell out the first output port to the ATM network with a multicast sending mechanism, said multicast sending mechanism separate and different from the unicast sending mechanism;

placing the multicast cell with the multicast sending mechanism;

placing the multicast cell into a first address FIFO block;

filling the address FIFO block with multicast cells;

requesting an additional address FIFO block;

creating a pointer to it from the first address FIFO block to form a linked list of address FIFO blocks; and placing the multicast cell into a multicast queue associated with the first output port.

* * * * *